United States Patent
Kikkawa

(10) Patent No.: US 11,612,235 B2
(45) Date of Patent: Mar. 28, 2023

(54) INTERDENTAL CLEANING TOOL

(71) Applicant: KOBAYASHI PHARMACEUTICAL CO., LTD., Osaka (JP)

(72) Inventor: Tasuku Kikkawa, Ibaraki (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 177 days.

(21) Appl. No.: 17/050,525

(22) PCT Filed: Apr. 26, 2019

(86) PCT No.: PCT/JP2019/017966
§ 371 (c)(1),
(2) Date: Oct. 26, 2020

(87) PCT Pub. No.: WO2019/208780
PCT Pub. Date: Oct. 31, 2019

(65) Prior Publication Data
US 2021/0251373 A1    Aug. 19, 2021

(30) Foreign Application Priority Data

Apr. 27, 2018  (JP) .............................. JP2018-087031

(51) Int. Cl.
*A46B 3/04*     (2006.01)
*A46D 1/00*     (2006.01)

(52) U.S. Cl.
CPC .............. *A46B 3/04* (2013.01); *A46D 1/0207* (2013.01); *A46B 2200/108* (2013.01)

(58) Field of Classification Search
CPC .. A46B 3/04; A46B 9/04; A46B 9/045; A46B 2200/108; A46B 2200/1026;
(Continued)

(56) References Cited

U.S. PATENT DOCUMENTS 3,775,848 A * 12/1973 Barnett .................. A61C 15/02
                                            433/142
5,775,346 A *  7/1998 Szyszkowski ......... A61C 15/00
                                            132/321
(Continued)

FOREIGN PATENT DOCUMENTS

JP      2004-209242 A      7/2004
JP      2016-521159 A      7/2016
(Continued)

OTHER PUBLICATIONS

International Search Report for International Application No. PCT/JP2019/017966 dated Jun. 11, 2019 (2 sheets, 2 sheets translation, 4 sheets total).
(Continued)

*Primary Examiner* — Joseph J Hail
*Assistant Examiner* — Jonathan R Zaworski
(74) *Attorney, Agent, or Firm* — Kratz, Quintos & Hanson, LLP

(57) ABSTRACT

An interdental cleaning tool capable of reducing possibility of a cleaning portion being detached from a shaft portion includes a base portion including a shaft portion (20) having a shape insertable in an interdental space, and a cleaning portion (50) that covers at least a portion of the shaft portion and is capable of cleaning an interdental space. The base portion further includes a protruding portion (40) that protrudes from a covered portion (22) in a direction intersecting the shaft portion (20), the covered portion (22) being a portion of the shaft portion (20) and covered by the cleaning portion (50).

6 Claims, 5 Drawing Sheets

(58) Field of Classification Search
CPC ...... A46D 1/0207; A46D 1/023; A61C 15/00; A61C 15/02
USPC .............................. 15/186–188, 167.1–167.2
See application file for complete search history.

(56) References Cited

U.S. PATENT DOCUMENTS

| | | | | |
|---|---|---|---|---|
| 6,772,467 | B1* | 8/2004 | Weihrauch | D01F 8/12 |
| | | | | 428/397 |
| 7,121,937 | B2* | 10/2006 | Turch | A46B 13/005 |
| | | | | 451/526 |
| 10,195,005 | B2* | 2/2019 | Wallstrom | A46B 9/005 |
| 10,299,577 | B2* | 5/2019 | Schar | A46B 3/005 |
| 11,147,657 | B2* | 10/2021 | Pbtsch | A46B 9/06 |
| 2010/0015567 | A1* | 1/2010 | Elbaz | A61C 17/02 |
| | | | | 433/89 |
| 2014/0166043 | A1* | 6/2014 | Dishon | A61C 15/02 |
| | | | | 132/329 |
| 2015/0114428 | A1* | 4/2015 | Kato | B29C 45/14073 |
| | | | | 264/243 |
| 2016/0058531 | A1* | 3/2016 | Adriano | A46B 3/005 |
| | | | | 132/329 |
| 2016/0367345 | A1* | 12/2016 | Wallstrom | A46B 9/005 |
| 2017/0189148 | A1 | 7/2017 | Kato | |
| 2017/0319309 | A1* | 11/2017 | Gengyo | A46B 9/04 |
| 2018/0193119 | A1* | 7/2018 | Butz | A61C 15/02 |
| 2018/0250104 | A1 | 9/2018 | Adriano | |
| 2018/0256298 | A1 | 9/2018 | Kikkawa | |
| 2019/0167397 | A1 | 6/2019 | Wallstrom | |

FOREIGN PATENT DOCUMENTS

| | | |
|---|---|---|
| JP | 2017-042493 A | 3/2017 |
| JP | 2017-506963 A | 3/2017 |
| WO | 2013/176297 A1 | 11/2013 |
| WO | 2014/023424 A1 | 2/2014 |

OTHER PUBLICATIONS

Extended European Search Report for European Patent Application No. 19791669.5 dated May 18, 2021 (8 sheets).

* cited by examiner

INTERDENTAL CLEANING TOOL

TECHNICAL FIELD

The present invention relates to an interdental cleaning tool.

BACKGROUND ART

Conventionally, an interdental cleaning tool for cleaning an interdental space is known. For example, Patent Literature 1 discloses an interdental cleaning tool including a base structure portion made of synthetic resin, and a soft portion made of elastomer. The base structure portion includes a core base structure portion having a shape insertable in an interdental space, and a handling base structure portion having a shape that can be held by fingers. The soft portion includes a covering portion that covers an outer circumferential surface of the core base structure portion, and a plurality of protruding portions each protruding outward from the outer circumferential surface of the covering portion.

CITATION LIST

Patent Literature

Patent Literature 1: WO 2013/176297 A

SUMMARY OF INVENTION

Problems to be Solved by the Invention

As for an interdental cleaning tool described in Patent Literature 1, a cleaning portion made of a material containing elastomer might be detached (peeled off) from a shaft portion when the interdental cleaning tool is being used for cleaning an interdental space.

An object of the present invention is to provide an interdental cleaning tool that can reduce possibility of the cleaning portion being detached from the shaft portion.

Solution to Problem

To solve the problem described above, the present invention provides an interdental cleaning tool including a base portion including a shaft portion having a shape insertable in an interdental space, and a cleaning portion that covers at least a portion of the shaft portion and is capable of cleaning an interdental space, where the base portion further includes a protruding portion that protrudes from a covered portion in a direction intersecting the shaft portion, the covered portion being a portion of the shaft portion and covered by the cleaning portion.

Even when an external force acts on the cleaning portion in a direction to pull out (peel off) the cleaning portion from the shaft portion during cleaning an interdental space by using the interdental cleaning tool, the protruding portion resists against the external force to reduce possibility of the cleaning portion being detached from the shaft portion.

The protruding portion is preferably provided in a proximal region which is a region of the covered portion between the base end portion of the covered portion and a portion distant from the base end portion toward the top end portion of the shaft portion along the axial direction of the shaft portion by nine tenths, more preferably, three fifths, or further preferably a half of the length of the cleaning portion.

Such a configuration further reliably reduces the possibility of the cleaning portion being detached from the shaft portion.

Furthermore, it is preferable that the cleaning portion includes a cleaning portion body that covers the covered portion, and a plurality of bristles each having a shape protruding outward from an outer circumferential surface of the cleaning portion body, the protruding portion includes a plurality of protrusions provided at positions of the covered portion spaced from one another, and a plurality of bristles includes covering bristles each covering the protrusion.

In such a configuration, the covering bristle among a plurality of bristles is supported by the protrusion and thus has a higher rigidity than other bristles. That is, the bristles provided in locations in the proximal region have relatively high rigidity, and the bristles provided in locations in a region of the covered portion further in the top end side than the proximal region have relatively low rigidity. This maintains insertion capability of the cleaning portion in the interdental space, and raises capability of cleaning by the covering bristles.

The protrusions each preferably has such a shape that the protruding length from the covered portion gradually increases along the direction from the top end side to the base end side of the shaft portion.

With this configuration, the covering bristle further in the base end side of the covered portion has a higher rigidity, so that the covering bristle effectively cleans the interdental space and the side surfaces of the teeth.

Furthermore, the cleaning portion is preferably made of a composite material containing elastomer and a reinforcing material.

Using such a material, the bristles are given a higher rigidity than when the cleaning portion is made only of elastomer, so that the side surfaces of the teeth can effectively be cleaned.

Advantageous Effects of Invention

According to the present invention as described above, an interdental cleaning tool that can reduce possibility of the cleaning portion being detached from the shaft portion can be provided.

DESCRIPTION OF EMBODIMENT

Figure 1:
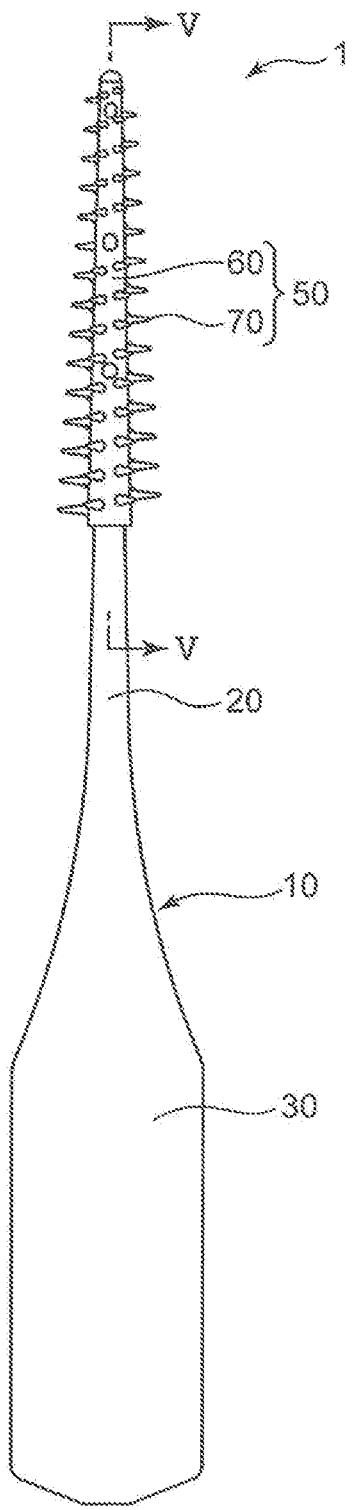
FIG. 1 is a front view of an interdental cleaning tool according to an embodiment of the present invention.
Figure 2:
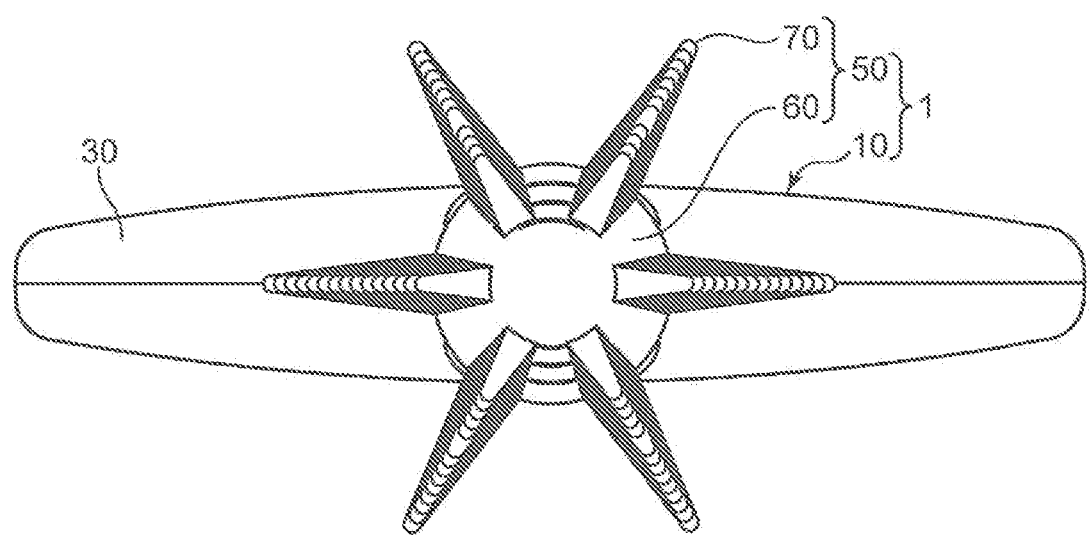
FIG. 2 is a plan view of the interdental cleaning tool illustrated in FIG. 1.

An interdental cleaning tool 1 according to an embodiment of the present invention will be described with reference to FIGS. 1 to 5. As illustrated in FIG. 1, the interdental cleaning tool 1 includes a base portion 10, and a cleaning portion 50.

The base portion 10 is made of a synthetic resin such as polypropylene, polyethylene, ABS, polybutylene terephthalate, polycarbonate, polyethylene terephthalate, polystyrene, and polyacetal. In the embodiment, the base portion 10 is made of polypropylene containing glass fibers by 30% by weight. The base portion 10 includes a shaft portion 20, a grip portion 30, and a protruding portion 40 (see FIGS. 3 and 5).

The shaft portion 20 has a shape extending in a specific direction (up-and-down direction in FIG. 1) and insertable in an interdental space. The shaft portion 20 has a shape whose a profile of the cross-section of the shaft portion 20 in a plane normal to an axial direction of the shaft portion 20 (the up-and-down direction in FIG. 1) gradually increases along a direction from a top end side to a base end side (opposite the top end side) of the shaft portion 20. In the embodiment, the cross-section of the shaft portion 20 in the plane is a circle. That is, in the embodiment, the shaft portion 20 has a form of a column of which outer diameter gradually decreases along the direction from a base end portion to a top end portion of the shaft portion 20. The cross-section of the shaft portion 20 may be an oval shape or a polygonal shape.

The grip portion 30 extends in the axial direction of the shaft portion 20 away from the base end portion of the shaft portion 20 and has a shape that can be held by fingers. The grip portion 30 has a flat shape.

The protruding portion 40 will be described later.

The cleaning portion 50 is a portion for cleaning the interdental space and the side surfaces of the teeth. The cleaning portion 50 is made of a resin material having a lower hardness than the base portion 10. Specifically, styrene elastomer is used as the resin material. Other materials, such as silicone, olefinic elastomer, and polyester elastomer, may also be used as the resin material. The cleaning portion 50 includes a cleaning portion body 60 and a plurality of bristles 70.

The cleaning portion body 60 covers at least a portion of the shaft portion 20 (portion including the top end portion of the shaft portion 20). The cleaning portion body 60 has a shape of which profile gradually becomes larger along the direction from the top end side to the base end side of the shaft portion 20. In the embodiment, the length between the top end portion and the base end portion of the cleaning portion body 60 is 15 mm.

Figure 3:
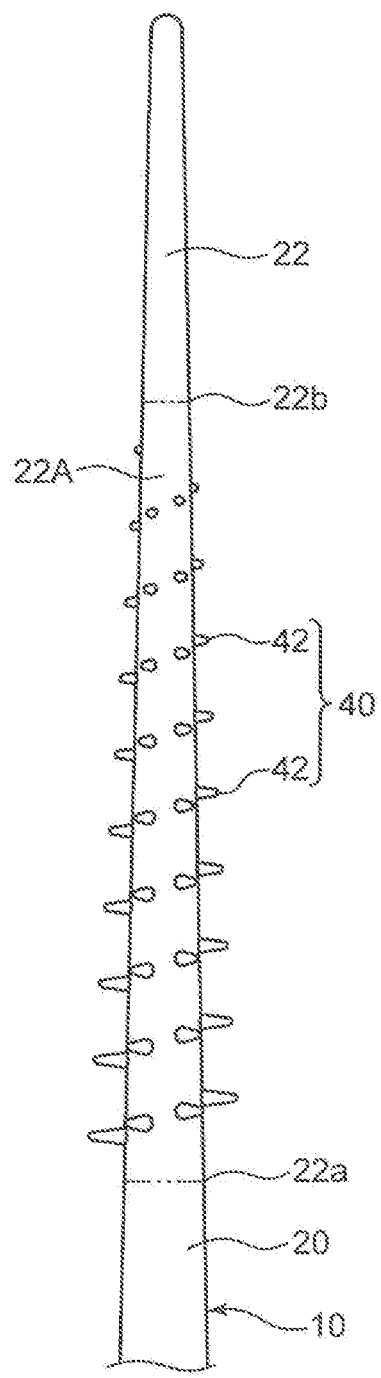
FIG. 3 is an enlarged view of a shaft portion and a protruding portion of the interdental cleaning tool illustrated in FIG. 1.
Figure 4:
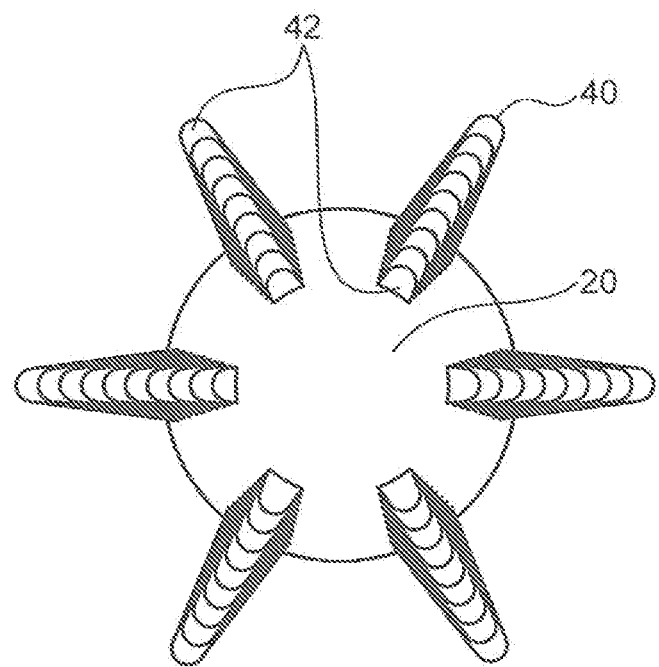
FIG. 4 is a plan view of the shaft portion and the protruding portion illustrated in FIG. 3.

The protruding portion 40 will now be described. The protruding portion 40 is provided on the outer circumferential surface of the shaft portion 20. Specifically, the protruding portion 40 has a shape protruding from a covered portion 22 which is a portion of the shaft portion 20 and covered by the cleaning portion 50 (see FIGS. 3 and 5) in a direction intersecting the axial direction. The protruding portion 40 includes a plurality of protrusions 42 provided at portions of the covered portion 22 distant from each other. The protrusions 42 each have a shape protruding outward from the covered portion 22 in a direction perpendicular to the axial direction. In the embodiment, the protrusions 42 each have a form of a cone. As illustrated in FIG. 3, a plurality of protrusions 42 is provided in a proximal region 22A which is a region of the covered portion 22 between a base end portion 22a of the covered portion 22 and a portion 22b distant from the base end portion 22a toward the top end portion of the shaft portion 20 along the axial direction by three fifths of the length of the cleaning portion body 60 (15 mm, in the embodiment). The distance from the base end portion 22a to the portion 22b can be set to any value in a range no larger than nine tenths of the length of the cleaning portion body 60 along the axial direction. In particular, the value is preferably set to a half of the length. The protruding length from the covered portion 22 of the protrusions 42 gradually increases along the direction from the top end side to the base end side of the proximal region 22A. A ratio of the protruding length from the covered portion 22 of a particular protrusion 42 to a diameter of a portion of the covered portion 22 where the particular protrusion 42 is connected is preferably from 0.1% to 50%, inclusive, more preferably from 1% to 30%, inclusive, furthermore preferably from 2% to 20%, inclusive, and particularly preferably from 4% to 10%, inclusive. In the embodiment as illustrated in FIG. 4, a plurality of protrusions 42 is disposed to protrude in six directions at an interval of 60 degrees along the circumferential direction of the shaft portion 20 in a plan view.

Figure 5:
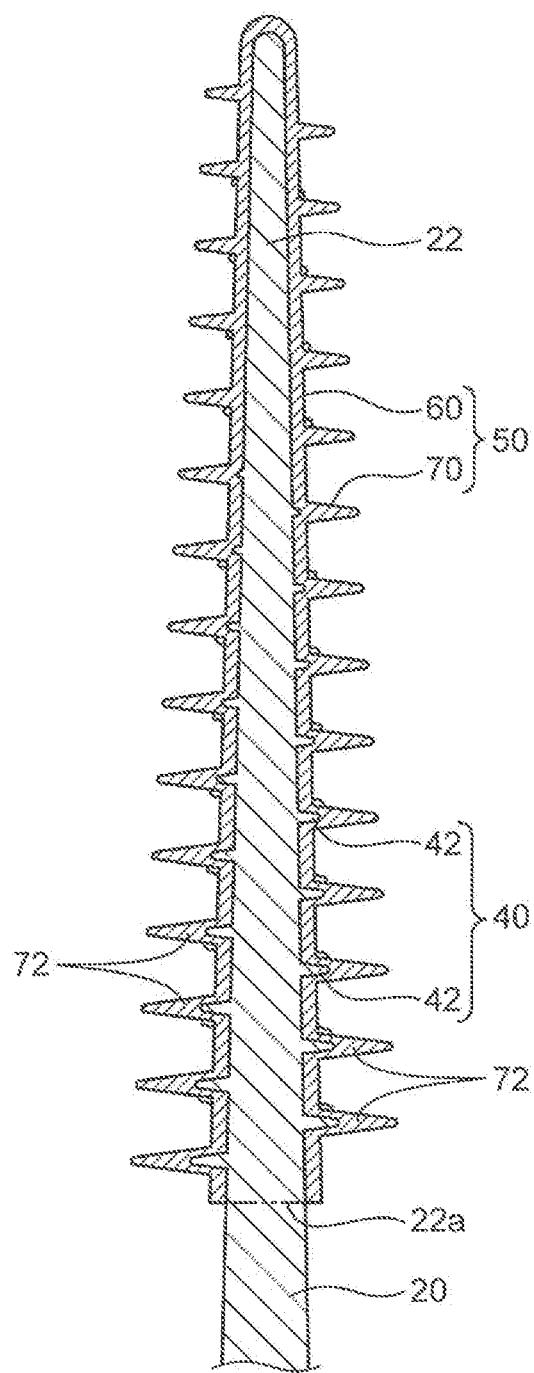
FIG. 5 is a cross-sectional view taken along a line V-V in FIG. 1.

A plurality of bristles 70 is provided on the outer circumferential surface of the cleaning portion body 60. Each of the bristles 70 has a shape protruding outward from the outer circumferential surface of the cleaning portion body 60 in an intersecting direction that intersects the axial direction. In the embodiment, the bristles 70 each have a form of a cone. The bristles 70 have shapes whose the protruding length from the cleaning portion body 60 gradually increases along the direction from the top end side to the base end side of the shaft portion 20. As illustrated in FIG. 5, a plurality of bristles 70 includes a plurality of covering bristles 72 each covering the protrusion 42. That is, each of the covering bristle 72 is provided at a location corresponding to that of the protrusion 42.

As described above, even when an external force acts on the cleaning portion 50 in a direction to pull out (peel off) the cleaning portion 50 from the shaft portion 20 during cleaning an interdental space by using the interdental cleaning tool 1 according to the present embodiment, the protruding portion 40 resists against the external force to reduce the possibility of the cleaning portion 50 being detached from the shaft portion 20.

Furthermore, since the protruding portion 40 is provided on the proximal region 22A of the covered portion 22, the possibility of the cleaning portion 50 being detached from the shaft portion 20 is further reliably reduced.

Furthermore, the protruding portion 40 includes a plurality of protrusions 42 provided at portions of the covered portion 22 distant from each other, and a plurality of bristles 70 includes the covering bristles 72 each covering the protrusion 42. The covering bristles 72 among a plurality of bristles 70 is supported by the protrusions 42, and thus have higher rigidity than other bristles 70. That is, the bristles provided in locations in the proximal region 22A have relatively high rigidity, and the bristles provided in locations in a region of the covered portion 22 further in the top end side than the proximal region 22A have relatively low rigidity. This maintains insertion capability of the cleaning portion 50 in the interdental space, and raises capability of cleaning by the covering bristles 72.

The protrusions 42 each have a shape whose the protruding length from the covered portion 22 gradually increases along the direction from the top end side to the base end side of the shaft portion 20. Thus, the rigidity of the covering bristle 72 increases toward the base end side of the covered portion 22, so that the covering bristle 72 effectively cleans the interdental space and the side surfaces of the teeth.

Note that the embodiment disclosed above should be considered as illustrative in all aspects and not by means of limitation. The scope of the present invention is defined by the claims, not by the description on the embodiment described above, and includes all alterations within the scope of the meanings equivalent to the claims and within the scope of the claims.

For example, the protruding portion 40 may be a single protrusion. In this case, the protrusion may have a shape extending along the circumferential direction of the covered portion 22.

Furthermore, a plurality of protrusions 42 may be provided on the entire region of the covered portion 22 (in a region between the base end portion 22a of the covered portion 22 and the top end portion of the shaft portion 20).

Furthermore, the protrusions 42 may each be provided at a location not corresponding to that of the bristle 70 (location distant from the bristle 70).

Furthermore, the arrangement of a plurality of protrusions 42 and a plurality of covering bristles 72 in a plan view is not limited to the arrangement in which the protrusions 42 and the covering bristles 72 protrude in six directions at an interval of 60 degrees along the circumferential direction of the shaft portion 20.

The protrusions 42 and the bristles 70 may each have a shape of a polygonal pyramid or a plate (flat shape).

The cleaning portion 50 may be made of a composite material containing the resin material and a reinforcing material (for example, glass fibers or talc). Using such a material, the bristles 70 are given a higher rigidity than when the cleaning portion 50 is made only of elastomer, so that the side surfaces of the teeth can effectively be cleaned. In this case, the composite material preferably contains the reinforcing material by 3% by weight to 50% by weight, inclusive, more preferably 5% by weight to 35% by weight, inclusive.

REFERENCE SIGNS 1 interdental cleaning tool
10 base portion
20 shaft portion
22 covered portion
22a base end portion
22A proximal region
30 grip portion
40 protruding portion
42 protrusion
50 cleaning portion
60 cleaning portion body
70 bristle
72 covering bristle

The invention claimed is:

1. An interdental cleaning tool comprising:
a shaft portion having a shape insertable in an interdental space;
a cleaning portion body that covers at least a portion from a top end portion of the shaft portion, a covered portion covered by the cleaning portion body having a proximal region extending over a predetermined length from a base end portion of the cleaning portion body, and a distal region extending from the proximal region to the top end portion of the shaft portion;
a plurality of protrusions protruding from an outer circumferential surface of the shaft portion in a direction intersecting the shaft portion within the proximal region whereas no protrusions protrude from the outer circumferential surface of the shaft portion in the distal region; and
a plurality of bristles protruding outward from an outer circumferential surface of the cleaning portion body in the proximal region and the distal region,
wherein bristles provided in the proximal region include a covering bristle covering a protrusion so that rigidity of the covering bristle becomes higher than rigidity of each of bristles provided in the distal region due to the protrusion.

2. The interdental cleaning tool according to claim 1, wherein the predetermined length of the proximal region is nine tenths of a length of the cleaning portion body along an axial direction of the shaft portion.

3. The interdental cleaning tool according to claim 1, wherein
the plurality of protrusions are provided to be spaced from one another.

4. The interdental cleaning tool according to claim 1, wherein each of the plurality of protrusions has a shape whose protruding length from the shaft portion gradually increases along a direction from the top end side to a base end side of the shaft portion.

5. The interdental cleaning tool according to claim 1, wherein the cleaning portion body and the plurality of bristles are made of a composite material containing elastomer and a reinforcing material.

6. The interdental cleaning tool according to claim 4, wherein the cleaning portion body and the plurality of bristles are made of a composite material containing elastomer and a reinforcing material.

* * * * *